(12) United States Patent
Öbrink et al.

(10) Patent No.: US 6,631,866 B1
(45) Date of Patent: Oct. 14, 2003

(54) DEVICE FOR FLY-FISHING

(76) Inventors: Olov H. Öbrink, Promenaden 2, Kungsör 736 30 (SE); Kent O. Öbrink, Täljstensvägen 16 B, Uppsala 752 40 (SE)

( * ) Notice: Subject to any disclaimer, the term of this patent is extended or adjusted under 35 U.S.C. 154(b) by 0 days.

(21) Appl. No.: 09/269,134
(22) PCT Filed: Sep. 10, 1997
(86) PCT No.: PCT/SE97/01523
§ 371 (c)(1),
(2), (4) Date: Mar. 12, 1999
(87) PCT Pub. No.: WO98/10641
PCT Pub. Date: Mar. 19, 1998

(30) Foreign Application Priority Data

Sep. 13, 1996 (SE) .............................. 9603326

(51) Int. Cl.[7] .............................. B65H 75/48
(52) U.S. Cl. .................................. 242/390.8
(58) Field of Search .......................... 242/404.1, 390.8, 242/394; 43/20, 21

(56) References Cited

U.S. PATENT DOCUMENTS

| | | | | |
|---|---|---|---|---|
| 1,990,135 A | * | 2/1935 | Sato ..................... | 242/404.1 X |
| 2,615,649 A | * | 10/1952 | Flewelling ............ | 242/404.1 X |
| 2,717,129 A | * | 9/1955 | McDonald ........... | 242/404.1 X |
| 2,874,477 A | * | 2/1959 | McConnell ............... | 43/20 X |
| 3,637,158 A | * | 1/1972 | Jacobsen ................ | 242/404.1 |
| 4,598,878 A | * | 7/1986 | Steffan ....................... | 43/21 X |
| 4,784,346 A | * | 11/1988 | Steffan ....................... | 43/21 X |
| 5,875,987 A | * | 3/1999 | Pullen ................. | 242/390.8 X |
| 5,954,285 A | * | 9/1999 | Whisenhunt ............... | 43/21 X |

\* cited by examiner

Primary Examiner—William A. Rivera
(74) Attorney, Agent, or Firm—Leo Stanger

(57) ABSTRACT

The present invention relates to a device for fly fishing comprising a line reel (1) for reeling in the fly line when utilizing preferably single-how rods for fly fishing, the line reel (1) comprisng a line spool (18) which, via friction operation, Is designed to be operated by a drive means initiated by the fisherman, the line reel (1) being preferably placed under one of the fisherman's upper arms while fishing and a turning wheel (30) cooperating with the line reel (1), which can be placed on the fly rod (3). The object of the invention is to eliminate the drawbacks of preparing the fly line and its hindrance during fishing, and primarily the drawback of the circumference of the line spool, of the fly reel, decreasing as the fly line is pulled out. This is achieved by the line spool (18) slipping in relation to the drive means, or rotating therewith, when the fly line (8) is pulled out, held still or pulled in by the fisherman so that the unloaded part of the fly line (8) behind the fisherman's hand is reeled in onto the line spool (18), whereupon a turn or so of the fly line (8) can be placed around the wheel (30) the circumference of which thus remains constant when the line is pulled out or reeled in by the fisherman using the wheel (30).

10 Claims, 4 Drawing Sheets

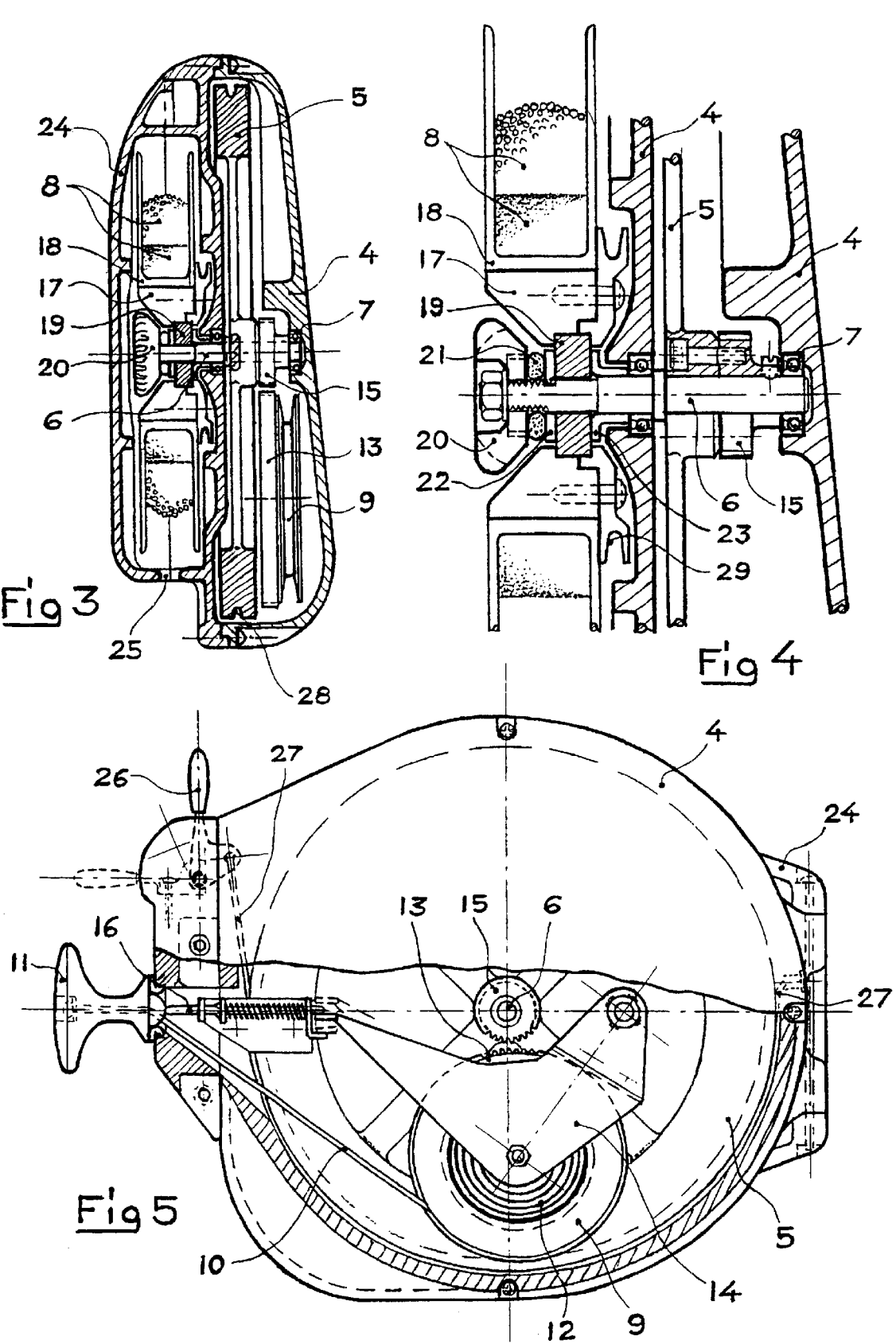

DEVICE FOR FLY-FISHING

TECHNICAL FIELD

The present invention relates to a device for fly fishing comprising a line reel for reeling in the fly line when utilizing preferably single-hand rods for fly fishing, and a reeling device cooperating with the line reel.

BACKGROUND ART

Fly fishing, a sport with very long history, differs from all other types of rod fishing since the imitations, the flies, provided with hooks lack the necessary weight to be cast out over the water. It is therefore the weight of the fly line that generates the requisite energy to carry the fly out through the casting movement.

The primary function of the conventional fly reel, provided with a reeling device and designed to be placed on the fly rod in a reel attachment so that the line spool in the direction of rotation and the extended fly line are aligned in the longitudial direction of the fly rod, is to store the fly line reeled onto the line spool. The length of the fly line does not normally exceed about 30 meter and a backing line is therefore placed on the line spool first so that a fish caught on the hook can pull out a sufficient length of line to prevent the thin leader with the fly at its end, from snapping. In certain cases, shooting-head, an even thinner running line is attached to the fly line, in that case shortened, which will also be termed the fly line in the following. Another function of the reel is that it may facilitate bringing in a fish that has been caught, since it is often provided with an adjustable brake acting in pull-out direction while the fisherman is reeling in the line and the fish in the other direction. Conventional fly reels are known with turning handles acting directly on the line spool, or with winders that act on the line spool via gears. One drawback with the directly acting handle is that the fisherman has little chance of reeling the line spool in high speed. It is more important in fly fishing than other forms of hook fishing to keep the line to the hooked fish taut since the fly hook is often small and is attached in the outer parts of the fish's mouth. It often happens, particularly with large fish, that after having pulled out the fly line and part of the backing line, the fish turns and rushes towards the fisherman. Since the circumference of the emptied line spool is then extremely small, it is impossible to reel in the loose line. The geared fly reel is preferable in such situations. However, it instead has the drawback of being larger, more difficult to wind and heavier. Despite its drawback, therefore, the fly reel with the winder acting directly on the line spool is usually preferred since it offers the last weight. Another drawback with the decreasing circumference, regardless of whether the fly reel is provided with directly acting winder or with gears, is that the braking force set in the fly line increases at it is pulled out from the line spool by a fish, which is extremely unfavourable since the resistance of the fly line in the water also increases as it is pulled out, resulting in the combined increased braking force, which is thus extremely undesirable, may cause the leader to break. It is also known to use so-called automatic fly reels, lacking any winder which, by means of a strong tension spring, reel in the fly line, by means of a control device operated by the fisherman, via gear transmission. The purpose of these reels is, in the event of movements, to be able to rapidly reel in the entire length of fly line cast out, which may be laying on or in the water and thus exerts considerable resistance. Or to reel in the loose line lying on the surface in order to achieve contact with a hooked fish quickly, after which the fish may work against the force in the tension spring while being drawn in. The drawbacks of such reels are that, due to the strong tension spring and the gear arrangement, they are considerably heavier than the geared fly reel, and that tightening of the tension spring which is usually achieved by means of a ratchet wheel arranged on the side of the reel, requires strength and several turns and should be done before the fly line is cast out. The tightening is otherwise performed when a suitable length is pulled of the line spool, which is hard work, before the fly line is cast out. Both these procedures are naturally extremely timeconsuming and troublesome.

In the case of extremely light fly rods, especially modern rods manufactured from carbon fiber material and the like, as is also emphasized in the marketing, due to its weight which often greatly exceeds that of the fly rod, the reel placed on the fly rod is often found disturbing to the rhythm of casting. It is known to unload the fly rod by placing the fly reel differently, for instance through US patent specifications U.S. Pat. No. 1, 013,347, U.S. Pat. No. 2,101,174, U.S. Pat. No. 2,361,189 where conventional fly reels are proposed with various arrangements for attaching them primarily to belt worn around the fisherman's waist. British patent specification GB 1 585 213 describes primarily a harness, with various arrangements for attaching the reel to the harness, designed to be carried an the chest of the fisherman. However, fly fishing as carried out through the centuries has another, considerably more troublesome drawback that has not been eliminated whether the conventional or so-called automatic fly reel is placed on the fly rods as intended, or anywhere else.

During casting of the fly line, usually accomplished by repeated casting movements to and fro to keep the line in the air as it is gradually fed out, the fly fisherman must use both hands. One hand is used to hold the rod and the other, the line control hand, releases, brakes and accelerates the line at the turn between casts. If the line is released before the intended cast is complete, it will lose its kinetic energy and drop straight down. This procedure enables cast lengths of approximately 20–25 meters, to be achieved with a single-hand rod, even more by skilled casters. When retrieving the fly line in the most usual type of fishing, i.e. wet-fly fishing, the fly is also retrieved directly through the fly line with one hand, which is necessary since different types of flies require smooth or jerky movements, often relatively slow, and the fisherman must sense the fish's bite directly in the hand to be able to raise the rod with the other hand and achieve firm hooking of the fish which often taking a cautious bite at the fly. Furthermore, the bite and contact with the fish felt directly through the hand is a satisfying moment for the fisherman and is one of the characteristics of traditional fly fishing.

Contrary to fishing with multiplier or spinning reels where the bait itself constitutes the casting weight, which can be cast out and then reeled in by means of the reel, the fly fisherman must pull out a sufficient length of the line from the spool for the intended cast every time he moves to a new casting position. In order to perform a fly cast of normal length, approximately 20–25 meters, a length of approximately 15–20 meters must be pulled cut from the spool before casting can commence, not counting the length already pulled out in the rod and leader. The fisherman may also choose to pull out the line from the line spool, however only by an arm's length since the spool has rotation resistance due to the brake being set to the strength of a hooked fish, at the same time as gradually feeding out the line through repeated casts, so called false casts, to keep the line in the air. However, this method is more time-consuming and limits the length of the cast. If the fisherman is an land or in a boat, for instance, the length of the line pulled out will fall on the ground or in the boat around the fisherman's feet. When fishing in running water, for salmon or sea trout, for instance, when the fisherman usually wades in the water so he can efficiently get the fly out into the main current, the line is quickly drawn down in an arc downstream of the fisherman. When the fisherman then fishes in the fly, or pulls in the fly line, the length of line previously pulled out again falls onto the ground, in the boat, or in the water, to be cast out again, and so on. When fishing is discontinued, in order to move to a new position for instance, the line is reeled on the reel again and the procedure must be repeated at the new site.

It lies in the nature of fly fishing to quickly move to casting position for a fish appearing visually, when it breaks the surface of the water to catch insects on or just above the surface, and the site for fly fishing, particularly from land, is thus frequently changed. It may then be a question of seconds to get the fly in the right position in front of the fish, or in the characteristic ring on the water, during the brief period after such a movement when the fish is within reach of a cast. The procedure of reeling in an pulling out the fly line prior to cast is extremely time-consuming, which thus also reduces the chances of catching the fish in comparison with fishing with multiplier or spinning equipment where the fisherman can immediately move himself and also cast the bait following such a movement. It is a paradox that fly fishing, which normally requires the greatest mobility and speed of all types of sport fishing, should have this time-consuming drawback.

What is worse, since the line lies on the ground, boat or water before casting, the fly line also encounters all kinds of obstructions. The light fly line has a remarkable ability to became tangled in stones, plants, twigs and roots, parts of a jetty, etc, or to catch in the duckboards and other objects such as oars, bag nets and fishing bags, etc, when the fisherman is in a boat. The fisherman must therefore extricate the line from such obstructions and arrange it before casting. In spite of this the line often catches during the actual cast, or the loops of the loose line became tangled together resulting in immediate stop, or the fisherman must divert concentration to release the line with his line control hand at the same time as keeping the line in the air, which usually leads to the fly landing in the wrong place for the intended fish. In both cases a new cast must be effected. The fisherman often unconsciously moves his feet while casting and treads on the line, or loops of the line slip in under his feet, which may also lead to an immediate stop. Also the necessity of choosing fishing positions as to the surface, always keeping an eye on the line and correcting it, maintaining the self-discipline of not moving one's feet, irrespective of how unsuitable they may be placed fore the balance of the body, all constitute troublesome and hindering drawbacks both for casting and fishing. Occasionally, when a fish has taken the fly and is rushing away, loops of the loose line get caught so effectively in something such as a root, a jetty or the duckboards in a boat, that the thin fly leader breaks and, for that reason alone, the fish is lost. All these problems of the loose line of course reduce the chances of catching the fish aimed at. Besides which, the fly line is a precision-made, expensive instrument which is unnecessarily damaged and its useful life is shortened as a result of always lying on the ground, etc, and the treatment it is thus subjected to in order to jerk it free from obstacles, etc, as well as the inevitability of the fisherman treading on the line against sharp and wearing objects.

When fishing from a float ring, i.e. the fisherman floating in the water supported by a float ring at waist level, which has become extremely popular particularly in USA, the same problems of the loose line catching in the cover of the ring and being retarded in the water are also applicable.

When fishing in running water the loose line is a constant, extremely troublesome, obstacle since the arc of line pulled down by the force of the current offers considerable resistance, which the fisherman must overcome by pulling in arm's lengths of line in repeated, otherwise unnecessary, false casts until the energy in the part of the line being cast overcomes the resistance, whereafter, and only thereafter, the cast can be thrown out to its full length. Otherwise the line must be taken in an held in loops in the line control hand to be gradually released during casting. This procedure is also troublesome and detracts from concentration. If several loops are released or dropped from the line control hand, which must also retain the part of the line to be cast, they usually become tangled and get caught in the rod rings. Each part-cast should therefore be limited to the size of the loop so that more false casts than would otherwise be necessary must be performed. These procedures are of course both time-consuming and exhausting, particularly when the fisherman is standing low in the water and must keep the cast high, at the same time as parrying the force of the current, besides which casting for this type of fishing is usually performed frequently and generally using heavy equipment.

DESCRIPTION OF INVENTION

The invention provides a solution of these and other associated problems. The fly-fishing device according to the invention is characterized in that the line reel comprises a line spool which, via friction operation, is designed to be operated by a drive means initiated by the fisherman, the line reel being preferably placed under one of the fisherman s upper arms while fishing, and also to a winder cooperating with and adapted to the line reel, which can be placed on the fly rod.

The object of the present invention is to provide a simple method of directly casting the fly line on all occasions when a cast is required, without limitation of the features of traditional fly fishing, i.e. casting and using the hands to fish the fly through the fly line, and thereby eliminating all the drawbacks of preparing the fly line and the hindrance it constitutes when fishing.

The invention also relates to eliminating the drawbacks arising due to the position of the fly reel on the fly rod, combined with the feature of storing the whole quantity of both backing and fly line, is heavy, and has a line spool with a circumference that decreases as the line is pulled from the spool.

The invention also offers the chance of fly fishing by casting and pulling in the fly line, or recovering fish caught with the line, using the hands, without the need for a fly reel for storing the lines being placed on the rod. The drawback of the weight of the fly reel and lines is thus eliminated.

All fly lines manufactured today and over the last 30 years or so are classed with regard to weight in accordance with the American classification system AFTM:A (American Fishing Tackle Manufacturers Association) where the weight of the line per length unit is the basic magnitude to which the fly rod is also adjusted at manufacture, and which is stated on each fly rod. According to this system fly lines are divided into classes from AFTM-1 up to AFTM-12 and occasionally more. In the lowest class, AFTM-1, the line has a weight of approximately 0.45 gram per meter, whereas the heaviest line, AFTM-10, which is only occasionally used for singlehand fly fishing, for instance, has a weight of approximately 2 gram per meter. This means that, with very little force, only the part of the free, unloaded fly line which in reeling direction is behind and between the fisherman's hand and the line spool can be reeled in when the fisherman fishes in the fly by hand or pulls in the fly line. The force required is only the slight amount required to overcome the weight of the part of the line which is substantially in vertical direction between the line spool and the ground, etc, where the fisherman is standing, substantially Irrespective of how much of the line may be lying on the ground, etc. This is achieved by means of a fly-fishing device in accordance with the invention, in the following termed line reel 1.

BRIEF DESCRIPTION OF THE DRAWINGS

FIG. 3 shows a vertical section through the line reel 1, seen from the front in the direction in which the fisherman is facing. FIG. 4 shows a portion of the same cross section revealing certain components more clearly. FIG. 5 shows the line reel 1, partially in section, see from the side which in the show embodiment is turned towards the fisherman's body.

DESCRIPTION OF EMBODIMENT

Figure 1:
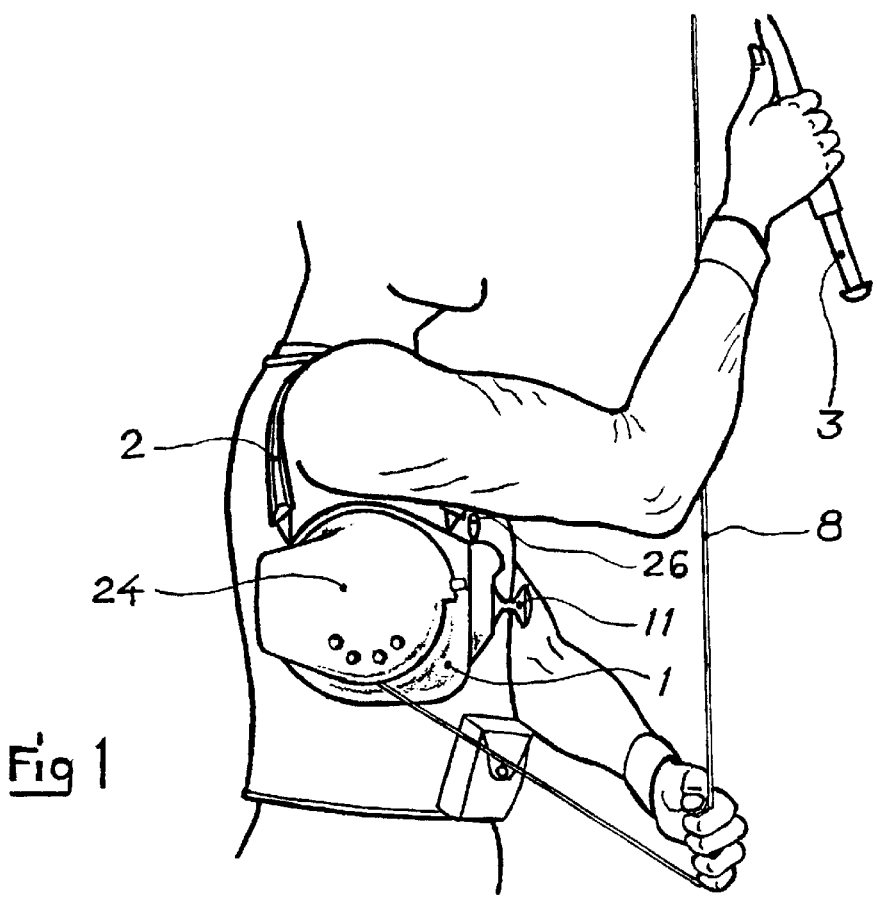
FIGS. 1 and 2 of the drawings show an advantageous placing of the line reel 1 when fishing.
Figure 2:
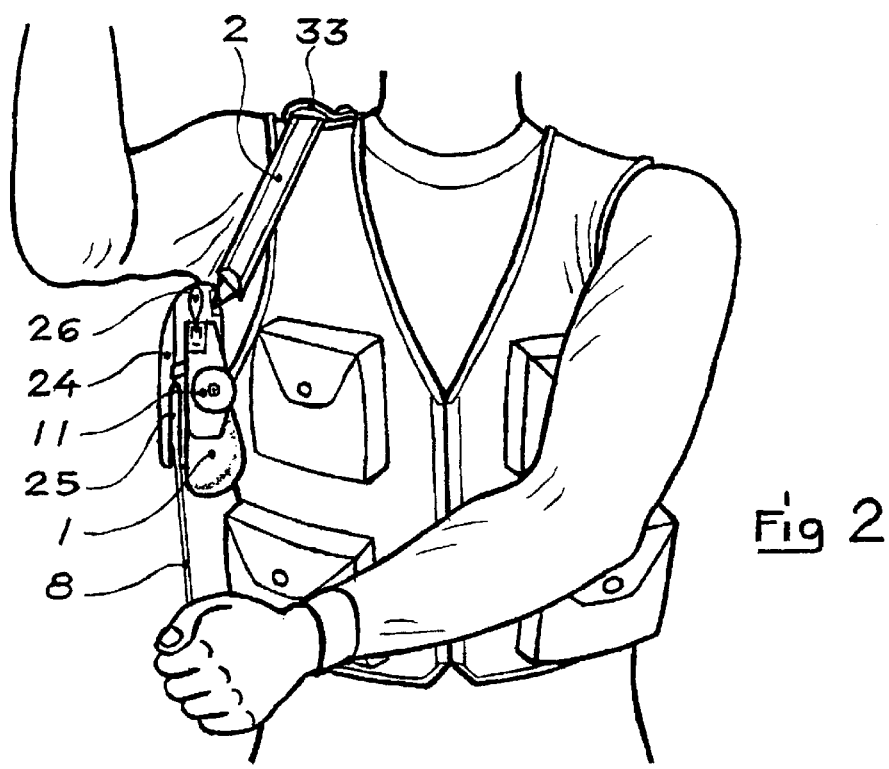

In the embodiment shown in FIGS. 1 and 2 the line reel 1 is preferably placed under an upper arm of the fisherman and suspended in a suitable arrangement which may consist of at least one strap 2, preferably running over at least one of the fisherman's shoulder. A locking device 33 may be provided to retain the strap 2 an the shoulder, such as a button arrangement which in locked position is joined to the strap 2 and the fisherman's waistcoat, for instance, or sane other locking device having similar function, or a loop or the like attached at one end to the waistcoat, for instance, with the other end folded over the strap 2 and locked with a button arrangement, for instance, to prevent the strap 2 from sliding of the fisherman's shoulder should he bend forward or to the side, for instance. The line reel 1 consist primarily of an outer casing 4 in which, in the embodiment shown, a flywheel 5 is rigidly connected to a shaft 6 journalled with preferably at least two ball bearings 7 in the casing 4 so that the shaft 6 suitably extends in longitudinal direction substantially perpendicular to the direction the fisherman is facing when casting and pulling in the fly line 8. The flywheel 5 can be caused to rotate by being wound up by a traction wheel 9 provided with a tension cord 10 terminating in pull-out direction in a handle 11. The handle is suitable placed on the forward side of the line reel 1, in the direction in which the fisherman is facing. The traction wheel 9 has a substantially U-shaped groove running around its outermost periphery to hold the tension cord 10 when wound up, and is provided with a tension spring 12, or similar force generating member, which when the tension cord 10 has been pulled out as far as necessary, rewinds it on the traction wheel 9. The traction wheel 9 is also connected to at least one driving wheel which, in the embodiment shown, consists of a toothed wheel 13, and is suspended in a movable cradle 14. The cradle 14 is movably attached at one part to the casing 4 and is so arranged that the toothed wheel 13 is completely disengaged from a corresponding driving wheel, shown as a toothed wheel 15, which is rigidly joined to the flywheel 5 or the shaft 6. This is to enable rewinding of the tension cord 10 on the traction wheel 9 when the flywheel 5 has been set in rotation, and in order to completely relieve the flywheel 5 of the friction forces from the traction wheel 9 and toothed wheels 13 and 15 when the kinetic energy of the flywheel 5 is to be released. When the flywheel 5 is to wound up by means of the tension cord 10, the cradle 14 is lifted by the opposing force prevailing in the tension spring 12, so that the toothed wheels 13 and 15 come into engagement with each other. Through the force arising between the toothed wheels 13 and 15 when the tension cord 10 is pulled out to overcome the moment of inertia of the flywheel 5, which is transplanted in the form of torque over the cradle 14, the toothed wheels 13 and 15 are kept tightly engaged during the winding up, thereby giving the flywheel 5 its rotation. The cradle 14 then falls down, in the embodiment shown through its own weight and that of the parts it carries, and disengages the toothed wheels 13 and 15 from each other when the tension cord 10 is unloaded and the energy in the tension spring 12 is using for rewinding the tension cord 10 on the traction wheel 9. The cradle 14 is then locked in its lower, disengaged position, by a bolt 16 or the like, shown in FIG. 5, which is held in its outer, non-activated position by, in this case, a compression spring, and is pushed in by the handle 11 when the latter reaches its end position on the line reel 1 upon rewinding. Similarly, the bolt 16 is released by the force of the compression spring when the handle 11 is released from the line reel 1 when the tension cord 10 is pulled out. In the embodiment shown a central piece 17 on the extension of the shaft 6 is rigidly connected to preferably at least one slide bearing 19 located movably on the shaft 6. A line spool 18 is applied on the central piece 17, on which spool the backing line and the fly line are reeled. In the following the backing and fly lines will be jointly termed the fly line 8 regardless of which is meant. The line spool 18 is blocked against rotation on the central piece 17 and is movably displaceable in longitudinal direction of the central piece 17 and the shaft 6 to enable simple exchange of the line spool 18 which may house a fly line 8 of a different type. In the embodiment shown in FIGS. 3 and 4 a screw control 20 is arranged at the end of the shaft 6, which is provided with screw threading for the purpose. This screw 20, either directly or via a resilient washer 21, compression spring or like, presses a friction disc 22, which is movably displaceable in longitudinal direction of the shaft 6 and blocked against movement in its direction of rotation, preferably against the side of the slide bearing 19 which is thus pressed with its opposite side against a friction dise 23, also arranged on the shaft 6, which is rigidly connected to the shaft 6 or manufactured as a part thereof, so that torque arising when the shaft 6, or the line spool 18 via the slide bearing 19, rotates, due to the friction forces between the friction discs 22 and 23 and the sides of bearing 19, can be increased or decreased with the aid of the screw control 20.

In order to protect the line spool 18 and the screw control 20, so that rotation is not prevented and the setting of screw control is not undesirably altered by coming into contact with the fisherman's body, e.g. his upper arm in the positioning shown in FIGS. 1 and 2, for instance, the line spool 18 and/or the screw control 20 may be completely or partially protected by a cover 24, which may consist of the casing 4 or at least one separate part of suitable shape, e.g. a net or grid, etc, in which case an opening 25 may be made in the cover 24 to allow passage of the fly line 8. The cover 24 preferably consists of a cover that can be opened, as shown in FIGS. 1,2,3 and 5, and is movably secured to the casing 4 by a hinge, for instance. The spool 18 and the screw control 20 are thus accessible. An opening 25 is provided, preferably on the forward and lower part seen from the front, through which the fly line 8 can pass. The opening is substantially oblong in shape, approximately half of it being in the cover 24, whereas the other part is in the casing 4. This is advantageous since the cover can be fully opened without risk of the fly line 8 accompanying it.

In order to lock the flywheel 5 and the line spool 18 so that especially the fly line 8 is not unintentionally pulled out, e.g. during movement, etc, the line reel 1 is provided with a brake handle 26, preferably on the front side, shown in FIG. 5, which in lowered position in the embodiment shown acts on a line brake 27 and at least partially blocks the flywheel 5 and the line spool 18 against movement in the directions of rotation, the line brake 27 extending and acting over the groove 28 in the outermost periphery of the flywheel 5 and, with its other part over the groove 29 which suitably extends around the central piece 17 or, as shown in FIGS. 3 and 4, around a part joined to the central piece 17. In another embodiment the brake handle 26 may just prevent rotation of the line spool 18.

When the fly line 8 is cast, which is done in traditional manner, the fisherman pulls out a suitable length of line 8 from the spool 18 in the line reel 1 for each to and fro casting movement, using the line control hand, as shown in FIGS. 1 and 2, suitably at the turn between casting movements. The line spool 18 then, via the central piece 17 and slide bearing 19, slips against the friction discs 22 and 23. Since the friction force set with the screw control 20 need only be sufficient to overcome the resistance of the free, unloaded part of the fly line 8, as described earlier, the line spool 18 has little rotary inertia and the fly line 8 can thus easily be pulled from the line spool 18 and reeled off it without impeding the normal casting process.

When the cast fly is to be fished in, therefore, or the fly line 8 is to be pulled in, the fisherman first lifts the flywheel 5 with his hand, using the tension cord 10 and handle 11, after which the kinetic energy of the flywheel 5 wound up to the requisite velocity is utilized by the friction forces acting over the adjustable pressure between the friction discs 22 and 23 and the sides of bearing 19 in such a way that the central piece 17 and line spool 18 slip if the fly line 8 is held still by the fisherman's hand, or rotate with the shaft 6 when the fisherman pulls in the fly line 8, whereupon the free, unloaded part of the fly line 8 situated behind the fisherman s hand is reeled onto the line spool 18. The same function occurs when a hooked fish is to be pulled in, the line spool 18 also slipping if the fish pulls out the fly line 8, e.g. if it makes a dash while being pulled in.

Figure 6:
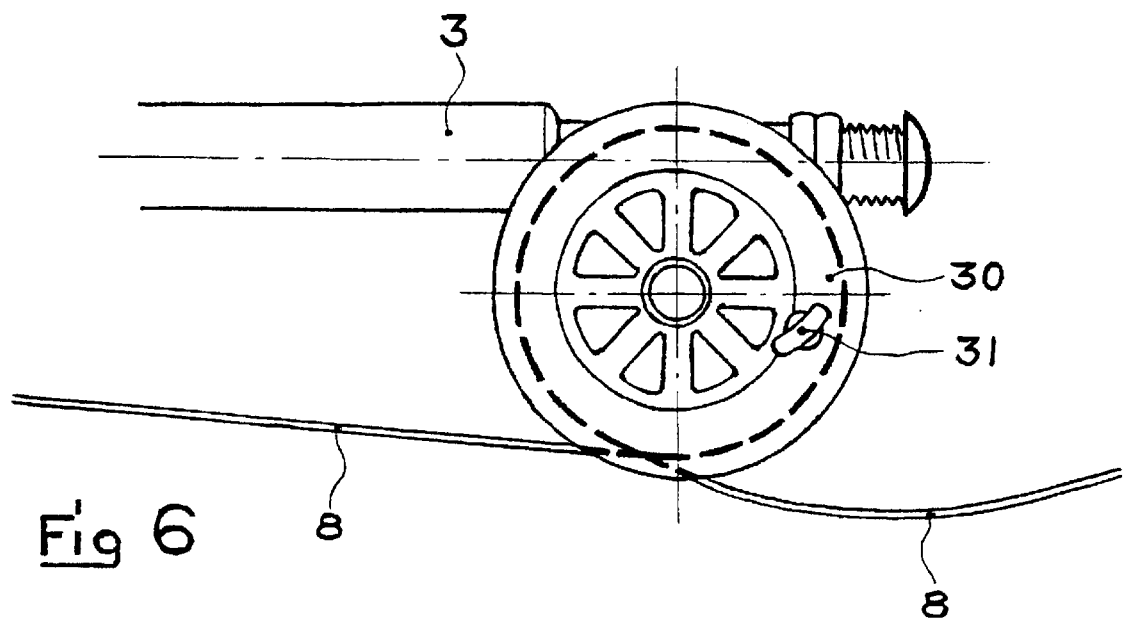
FIG. 6 shows a winder according to the invention which can be placed on the fly rod 3, seen from the side.
Figure 7:
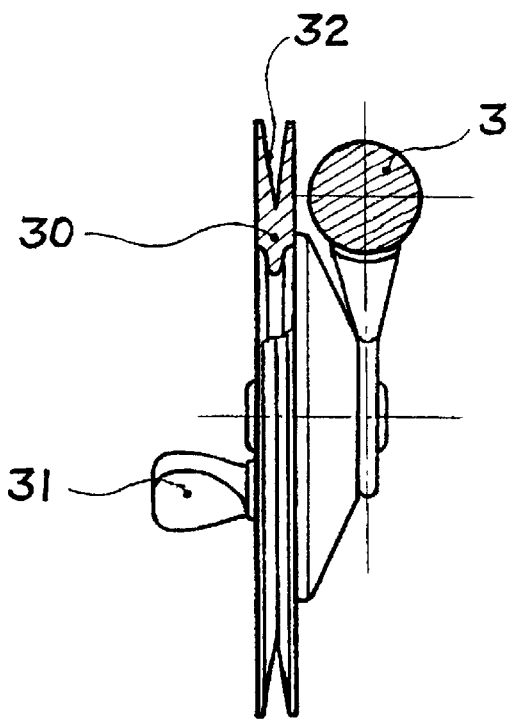
FIG. 7 shows a partially vertical cross section of the same winder seen in longitudinal direction of the fly rod 3.

When fishing for large fish, and catching them, it is advantageous to pull in the fish with the aid of a reel provided with handle and brake. For this purpose a special winder according to the invention, termed turning wheel 30, which is specially designed for the line reel 1 and is preferably provided with an adjustable brake acting in the pullout direction, is fitted on the fly rod 3, e.g. with a conventional reel attachment as intermediary. The turning wheel 30, shown in FIGS. 6 and 7, is provided with a handle 31 and preferably has a groove 32, preferably substantially V-shaped, extending around the turning wheel 30, preferably around its outermost periphery, in which the fly line 8 passes and is pressed down when the fisherman, with at least one turn around the wheel 30 places a section of the fly line 8 in the groove 32 so that the friction force between the fly line 8 and turning wheel 30 is also increased. When the fly line 8 is pulled out by the hooked fish, against the action of the brake if any, or is wound in by the fisherman using the turning wheel 30, the circumference of the turning wheel 30 and the fly line 8 placed around it remains constant, irrespective of how much of the fly line 8 passes over the turning wheel 30 in one or the other direction of rotation, the free, unloaded part of the fly line 8 behind and between the turning wheel 30 and the line reel 1, is pulled out from the line spool 18 or reeled in onto it.

The turning wheel 30 thus eliminates the drawbacks of a line spool whose circumference decreases as the fly line is pulled off the line spool. The turning wheel 30 is thus in a simple manner given the functional advantages of the geared reel, as well as also eliminating the drawback of the braking force set increasing in the fly line at the rate at which it is pulled from the line spool.

Since the turning wheel 30 placed on the fly rod 3 lacks the function of storing the entire quantity of the fly line required, and can be made with a width adapted only to suit the thickness of the fly line 8, it can be greatly reduced in size and weight. The turning wheel 30 thus also greatly alleviates the drawback of the weight of the fly reel placed on the fly rod.

EXAMPLES OF MODIFICATIONS

The invention is naturally not limited to the advantageous examples and embodiments described above. Many modifications are feasible. The central piece 17 and the line spool 18 may comprise a coherent part or the central piece 17 may consist entirely of the bearing 19. The friction discs 22,23 may be one or more and may operate in axial or radial direction against one or more bearings 19, or parts thereof, or parts joined to or separate from the bearing 19. The friction discs 22,23 and the bearing 19 or parts thereof, or parts against which the friction discs 22,23 operate may have any shape suitable for their common function, and may consist of any material suitable therefor. The friction discs 22,23, or at least one, may thus act on a part joined to the central piece 17 or the line spool 18 and bearing 19, or against a part joined to these components but separated from the bearing 19. The friction discs 22,23 and/or the bearing 19 and/or the screw control 20 may be placed on at least one separate part applied on the shaft 6. The shaft 6, or at least a part connected thereto, may be divided into at least two parts or the part, without being separated, and with the help of the screw control 20, may be pressed in radial direction against the bearing 19 or against a part jointed to the bearing 19 or separate from the bearing 19. The screw control 20 may be placed on the central piece 17 or the line spool 18 which may be provided with internal threading for the purpose, for instance, in which case the bearing 19 may consist of at least two parts, one of which is movable in longitudinal direction and blocked in direction of rotation, which by means of the screw control 20 are pressed together via intermediary of at least one friction disc 23, which is rigidly connected to the shaft 6, or to a part connected thereto. In the same way, a part separate from the bearing 19, via the intermediary of at least one friction disc 23, may be pressed against the bearing 19, or against a part also separate from the bearing 19. With this placing of the screw control 20, for instance, the bearing 19 or a part joined to or separate from the bearing 19 may be divided into at least two parts or the part, without being divided, may be pressed in radial direction by the screw control 20 against the shaft 6, or against a part corrected thereto. If the screw control 20 is so placed, the friction operation may also be arranged without the aid of the shaft 6, the bearing 19 consisting, for instance of at least two parts, one of which is connected to the central piece 17 in the direction of rotation and movably displaceable in longitudinal direction and movably placed on the shaft 6, or on a second shaft, separate from the shaft 6, and may be rigidly connected to the casing 4, for instance, or on at least one part applied separately thereon. In this case the part is pressed by the screw control 20 against the second part of the bearing 19 which is connected to the central piece 17, for instance, and separate from shaft 6 or from the second shaft, via intermediary of at least one friction disc 23 connected to the drive means and separate from the shaft 6 or from the second shaft. If the friction discs 22,23 are connected to the drive means, all embodiments for transmission of the friction operation in axial or radial direction can be achieved as described for when the friction discs 22,23 are placed on the shaft 6. The bearing 19 may also consist of ball or roller bearings, suitably those designed for axial loads, in which case the friction forces between the bearing tracks can be increased and decreased directly by means of the screw control 20, and the friction discs 22,23 may be omitted. The screw control 20 may also comprise any arrangement suitable for the function. However, an arrangement with the bearing 19 in the form of a slide bearing, placed directly on the shaft 6, and with the screw control 20 and friction discs 22,23 placed directly on the shaft 6, acting against the sides of the bearing 19, is to preferred since it offers the simplest solution, easily adjusted friction force and, not least important, relieves the line spool 18 from unnecessary moment of inertia. However, the friction operation can be achieved in any suitable manner and using any suitable driving source.

Figure 8:
FIG. 8 shows an embodiment for driving a spool.

The friction operation may be arranged in at least two ways, such as with the aid of an electric motor which is initiated by the fisherman by means of a switch preferably situated at the front of the line reel 1. The motor may drive the line spool 18 via a device for conversion to friction operation, either direct, or via a gear arid/or drive chain, drive belt or other power-transmission means. See FIG. 8.

Figure 9:
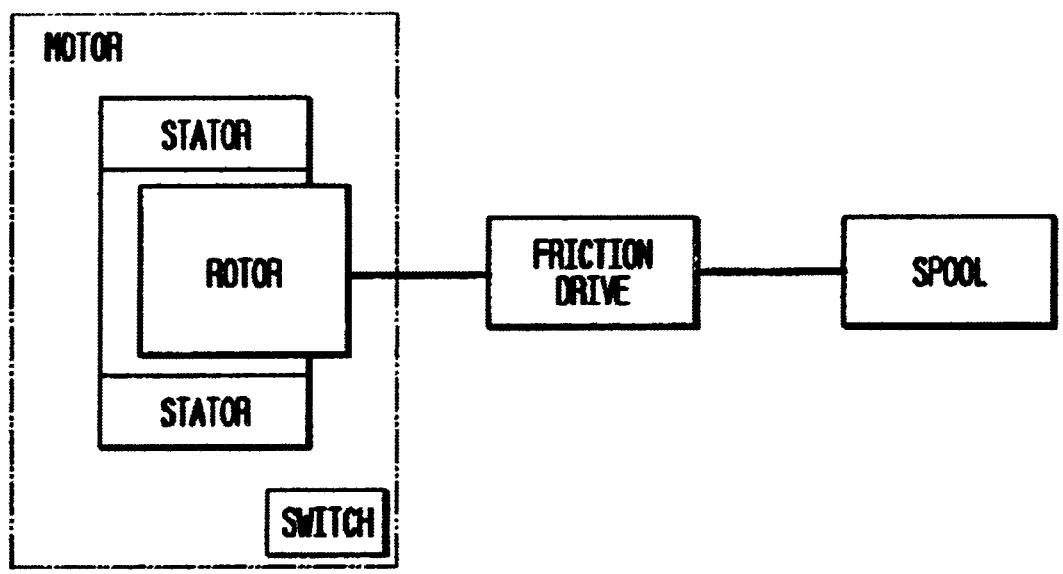
FIG. 9 illustrates another embodiment for driving a spool.

Alternatively the friction operation can be arranged by adjusting the propulsion force of the motor to the force required for reeling in the free, unloaded part of the fly line 8 on the spool 18 so that, functionally, the friction operation is effected directly through the force field arising between the rotor and stator of the motor, the force being overcame when the fly line 8 is kept still by the fisherman or pulled out from the line spool 18, or the free, unloaded part of the fly line 8 is reeled onto the spool 18, through the adjusted propulsion force of the motor when the fly line 8 is pulled by the fisherman so that the rotor directly or via gear arid/or drive chain, drive belt or other power-transmission means, is connected to the central piece 17 or line spool 18 or to the shaft 6, in which case the central piece 17 or the line spool 18 is rigidly connected to the shaft 6 and the bearing 19 is omitted. See FIG. 9.

Figure 10:
FIG. 10 shows another embodiment for driving a spool.

The friction operation can also be arranged with the aid of a clockwork mechanism which, via an arrangement for conversion to friction operation, drives the line spool 18, the rotation regulator of the clockwork mechanism being adapted to a suitable speed for the line spool 18 so that the force of the operating spring is distributed over a suitable passage of time. The spring is wound up by the fisherman, preferably using the tension cord 10, to the force necessary for driving the line spool 18. See FIG. 10.

However, flywheel 5 operation is preferred since it is a technically uncomplicated solution, the only movable part being the shaft 6 in the bearings 7 thereby giving longer service life, without faults, due to the minimized wear, and also because it can be initiated by the fisherman without the need for an accumulator or other drive means.

The winder can be modified in many ways. The groove 32 extending around the turning wheel 30 may be single or multiple and may be differently shaped, e.g. mainly trapezium, W or U shaped. The turning wheel 30 may also be substantially flat if one or more, preferably fixed, supports are arranged on the sides to prevent the fly line 8 from slipping off the turning wheel 30. Furthermore, the parts of the turning wheel 30, or the groove 32, in contact with the fly line 8 may be friction reinforced, e.g. by ridges, etc, and at least one part applied separately on the turning wheel 30, may constitute the periphery or may entirely or partially carry the groove 32. The latter may also, like the turning wheel 30, be made of a resilient material, for instance. The turning wheel 30 may of course also be provided with a winder which acts via transmission on the turning wheel 30 arid/or anti-reverse function, a winder wherein the crank is stationary upon rotation of the turning wheel 30 in pulling-out direction of the fly line 8. Essential for the invention, however, is that the function is achieved through the constant circumference.

Finally, it may also be clarified that location of the line reel 1 on the fly rod 3, via a conventional reel attachment, for instance, is not excluded. in such an embodiment the line spool 18 can also be provided with a braking means, preferably adjustable, which can be engaged and disengaged and which acts in the pulling-out direction of the fly line 8, and a winder such as a turning handle acting directly on the line spool 18 so that, upon hooking a fish, the fisherman can pull it in with the aid of the brake and winder, the line spool 18 being independent of the drive means during this phase, thanks to the friction operation.

The invention can thus be varied in many ways with reference to the examples described above and similar examples, and even in other ways, within the scope of the appended claims.

What is claimed is:

1. A fly fishing device for feeding and reeling fly line to and from a rod held by a fisherman, comprising a line reel for reeling in the fly line, he line reel including a frictionally controlled line spool, a driver coupled to the line spool for actuation by the fisherman, a support coupled to the line reel for holding the line reel under one of the fisherman's upper arms while fishing;

said line reel including a turning wheel mounted on the fly rod and for engaging the fly line, a winder with a winding handle acting directly on the wheel and having an adjustable brake action the wheel in the pull-out direction of the fly line said wheel having a groove extending around the wheel so that by turning the wheel part of the fly line is wound in the groove and the fly line wound around it will remain constant regardless of how much of the fly line passes over the wheel in both directions of rotation.

2. A fly fishing device for feeding and reeling fly line to and from a rod held by a fisherman, comprising a line reel for reeling in the fly line, the line reel including a frictionally controlled line spool, a driver coupled to the line spool for actuation by the fisherman , a support coupled to the line reel for holding the line reel under one of the fisherman's upper arms while fishing: said line reel including a flywheel frictionally coupled to the line spool and said line reel further includes a tension cord for spinning said flywheel so that the fisherman can provide the flywheel with kinetic energy to operate the line spool via the intermediary of the tension cord.

3. A fly fishing device for feeding and reeling fly line to and from a rod held by a fisherman, comprising a line reel for reeling in the fly line, The line reel including a frictionally controlled line spool, a driver coupled to the line spool for actuation by the fisherman a support coupled to the line reel for holding the line reel under one of the fishermans upper arms while fishing: said line reel including an electric motor, frictionally connected to the line spool, a switch on the motor driving the line spool for initiation by the fisherman.

4. A device as in any of claims 2 or 3 wherein said driver includes an actuator and said line spool includes a central portion, said driver further including a screw control coupling said actuator to said line spool, said screw control including a friction disc to exert an adjustable pressure on the central portion and inhibit movement in the direction of rotation, so that the friction forces acting between the actuator and the central portion can be increased or decreased, thereby allowing the line spool to slip in both directions of rotation in relation to the actuator in its direction of rotation.

5. A device as in any of claims 1, 2, or 3, wherein said support includes a strap, and a restraint having a locking device, said strap being arranged for the line reel being suspended, running over at least one of the fisherman's shoulders and being restrained from slipping off the shoulder by the locking device which in locked position is joined to the strap and the fisherman's clothing.

6. A device as in any of claims 1, 2, or 3, wherein said line reel includes a cover, said cover having an opening, the line spool being partially protected by the cover, the opening serving to permit passage of the fly line, the cover having an openable portion located in the cover thus allowing the cover to be opened without the fly line accompanying it.

7. A device as in claim 2, wherein said line reel includes a cradle, a casing enclosing the line spool, a traction wheel, a handle on said traction wheel, a tension spring, a first driving wheel and a second driving wheel, sad flywheel, and a locking device coupled to the cradle supporting the traction wheel on which the tension cord is reeled, the traction wheel supporting the tension spring and being connected to the first driving wheel, the cradle being arranged so that in its non-activated state keeps the first driving wheel disengaged from the second driving wheel, the second driving wheel being connected to the flywheel whereby, when the tension cord is pulled from the traction wheel, the cradle is activated by opposing forces then exerted in the tension spring so that the first and second driving wheels come into engagement with each other, thereby rotating the flywheel, after which the cradle resumes its non-activated state and releases the driving wheel from each other when the tension cord is unload and the energy in the tension spring is utilized for rewinding the tension cord, thereafter the cradle is locked in its non-activated state by the locking device said locking device being actuable by the handle when it reaches its end position on the line reel upon rewinding, the locking device being released when the handle is released from the line reel when the tension cord is pulled, and thus enables the tension cord to be rewound on the traction wheel when the flywheel has been caused to rotate, and the flywheel to be completely relieved of the friction forces from the device, when its kinetic energy is released.

8. A device as in any of claims 1 or 2 wherein said line reel includes a friction drive, an electric motor having a rotor and stator, said motor having a switch, the friction drive coupling the rotor on the electric motor to the line Spool, the motor driving the line and being initiated by the fisherman via the switch, the switch being placed on the forward side of the line reel, the friction drive being responsive to the driving force of the motor depending on a force field arising between the rotor and stator of the motor to a force necessary for the fine spool to rewind free, unloaded part of the fly line so that the force field is overcome when the fly line is held still by the fisherman or is pulled out from the spool, or the force field overcomes the force required for rewinding the unloaded part when the fly line is pulled in by the fisherman, whereupon it is reeled in onto the line spool.

9. A device as in any of claims 1, 2, or 3, wherein said line reel further includes a rotation regulator, a spring, and a tension cord, said rotation regulator connecting the spring to the line spool, said tension cord winding the spring upon actuation by the fisherman so that is has sufficient force to drive the line spool.

10. A device as in any of claims 1, 2, or 3, wherein said support includes a housings, a fastening arrangement at the top of the housing, and a strap sufficiently long to fit over a shoulder and under an arm of a fisherman connected to said fastening arrangement.

\* \* \* \* \*